Patented Aug. 7, 1951

2,563,792

UNITED STATES PATENT OFFICE 2,563,792

RECORD MOLDING COMPOSITION

George F. Metz, Diamond Point, N. Y., assignor to Shawinigan Products Corp., New York, N. Y., a corporation of New York No Drawing. Application November 20, 1946,
Serial No. 711,211

11 Claims. (Cl. 260—27)

The present invention relates to resinous compositions capable of use as binders and to filled molding compositions containing the same and suitable for the manufacture of phonograph records and of other pressed or molded articles.

More specifically, the invention relates to resinous binders particularly adapted for the manufacture of molding compositions for phonograph records by reason of low cost and satisfactory molding characteristics under the conditions usually prevailing in phonograph record manufacture.

While the resinous compositions of my invention can be used either alone or with other substances which are not, strictly speaking, fillers, they are of special advantage when used as binders for molding compositions containing fillers, and will, therefore, for convenience be hereinafter generally referred to as binders although not restricted to such use.

It is the general object of the present invention to provide an improved binder for pressable or moldable compositions containing filler materials, such binder consisting for the most part of relatively cheap thermoplastic materials which themselves are incapable of satisfactory use as a binder, especially for molding compositions requiring strength, as for the manufacture of phonograph records.

It is a further object of the invention to provide a binder for molding compositions by toughening and strengthening relatively cheap, sharp melting, more or less brittle resins with relatively small proportions of a tough polyvinyl acetal resin, whereby on mixture with a filler, a cheap molding composition of sufficient strength and form-stability for use in the manufacture of phonograph and other sound records is obtained.

A still further object of the invention is the production of resinous binders for molding compositions which are adapted for the manufacture of phonograph records approximately according to the molding time-temperature cycle common in the use of shellac compositions.

It is also an object of the invention to provide a molding composition characterized by satisfactory molding qualities and a high degree of strength and form stability by utilizing therein a binder compounded of a preponderating proportion of one or more thermoplastic, rather brittle, sharp melting resins with a small proportion of a tough, polyvinyl acetal resin which itself is characterized by poor molding qualities.

Other objects, and the manner in which they are attained, will appear from the following detailed description of the invention.

It has heretofore been the practice in the manufacture of certain types of phonograph record compositions to employ as the major component of the binder a resinous material of high toughness and strength, since such properties are essential in the molded article. This tough, strong resin was then modified with other resins in order to overcome certain defects of the first resin. A most common defect was the relatively poor moldability of the tough resin, especially at the temperatures and pressures usually employed in phonograph record manufacture. Thus, the tough resins, as a rule, do not have the necessary fluidity at record molding temperatures to enable faithful reproductions to be made therewith. To overcome this defect, the tough resin was "fluxed" with an approximately equal quantity, or with a considerably smaller quantity, of a resin having a considerably lower softening point to impart greater fluidity to the mixture at molding temperatures and to make it workable within a reduced molding time cycle.

Thus, in my copending application Serial No. 591,233, filed April 30, 1945, for "Molding Composition and Process for Manufacturing Same" I have described a molding composition whose most significant component is a polyvinyl acetal resin which is fluxed by means of sharp-melting thermoplastic resin; whereby the tough and horny acetal resin is rendered moldable at normal phonograph record molding temperatures. A phonograph record manufactured from this composition has a high degree of strength, but can not be moldable within the time period usually employed with shellac records, so that the rate of production is reduced. Also, because of the high content of the relatively expensive polyvinyl acetal resin, the cost of the records is rather high.

I have found that instead of utilizing the high molecular weight, tough and strong resin as the major component of the binder and modifying it with an approximately equal or smaller quantity of resinous materials having great fluidity at molding temperatures, a much cheaper and yet highly satisfactory molding composition can be prepared in which the cheaper, easily fusible, tough brittle resins constitute the major component of the binder while a relatively small proportion of a polyvinyl acetal resin is mixed therewith to impart thereto sufficient toughness and strength while yet retaining to an adequate degree the requisite fluidity at the common molding temperatures. By employing the tough, high molecular weight polyvinyl acetal resin as a modifying agent for the cheaper, brittle, sharp melting resins I have provided a molding composition which not only is considerably cheaper than that described, for example, in the above-mentioned application, but can be employed for the manufacture of phonograph records at substantially the temperatures and within the molding time cycle commonly employed in making shellac records.

According to the present invention, therefore, the binder is composed primarily of relatively sharp melting, more or less brittle, but relatively cheap resinous material which is itself unsuitable for the manufacture of molded articles requiring strength and toughness, and is toughened and strengthened by a minor proportion of a toughening agent in the form of a high molecular weight, polyvinyl acetal resin which is compatible with the sharp melting resinous material. Whereas in the above-mentioned application the quantity of high molecular weight, tough resin constitutes a large proportion, even as high as 50 per cent or more of the total weight of materials forming the binder, I have found that highly satisfactory molding compositions superior in many respects to shellac compositions and able to compete with such compositions in the manufacture of phonograph records, can be obtained by toughening relatively large quantities of cheap, sharp melting, brittle resins with relatively small proportions of the more expensive polyvinyl acetal resins having great toughness and strength. The compounded mixture so obtained is one possessing sufficient strength, and resistance to warp and to needle wear, and having other properties which make it highly suitable for the manufacture of phonograph records.

In the compositions of the present invention, the tough, high melting polyvinyl acetal resin of poor molding qualities, which in my above-entitled application is referred to as a refractory resin, constitutes no more than about 25% of the total weight of such resin and sharp-melting, thermoplastic resin. In general, I prefer to employ the minimal amount of polyvinyl acetal resin sufficient to toughen the sharp-melting, brittle resin component to a degree which will make a filled molding composition prepared with the binder suitable for phonograph record manufacture. This minimal quantity will usually be of the order of about 10% of the total resinous content.

The more or less brittle, sharp-melting, thermoplastic resins employed in my improved binder may be of various types compatible with the polyvinyl acetal resin and preferably have a melting point within the range of about 195 to about 250° F., a maximum of 240° F. being generally most satisfactory where the binder is to be employed for the manufacture of phonograph record molding compositions. The indicated melting points are those obtained by the ball and ring method. One suitable resin of this type is the petroleum hydrocarbon-insoluble, aromatic hydrocarbon-soluble resinous pine wood extract containing oxidized abietic acid, preferably that extracted from long-leaf yellow pine trees and available on the market under the name "Vinsol," such resin having a melting point of about 224° F. (ball and ring method). This resinous pine wood extract may be and preferably is replaced in part by a coal tar pitch or gashouse pitch, a satisfactory material of this type being sold under the name "Carbonex," which is a mixture of these pitches and has a softening point of about 205–220° F. by the ball and ring method in glycerine. It contains about 40–44% insolubles in benzene and may be present in a quantity equal to that of the resinous pine wood extract or even greater. Hardwood pitches like "Demi-Gum" and hydrogenated rosin like that sold under the name "Staybelite" are other fluxing resins that may be used.

The high molecular weight polyvinyl acetal resins utilized in the present invention are of the type described in the patent to Morrison et al., Reissue No. 20,430, and may be prepared by hydrolyzing a high viscosity polyvinyl ester resin or gum, such as a polyvinyl acetate resin, of high molecular weight, that is, of high viscosity, with a hydrolyzing agent, such as a strong mineral acid like sulfuric, until the resin is hydrolyzed to a high degree, followed by reaction with an aldehyde (which may be present during the hydrolysis or added subsequently thereto). Thus a commercial product known as polyvinyl acetate and sold under the trade name "Gelva" and prepared by polymerizing vinyl acetate, can be hydrolyzed to various degrees and reacted with different aldehydes, such as formaldehyde, acetaldehyde, butyraldehyde, benzaldehyde, etc., and mixtures of aldehydes, to form resinous products certain of which are known as polyvinyl formal, polyvinyl acetal, polyvinyl butyral, and polyvinyl benzal and are presently sold under the trademarks "Formvar," "Alvar," "Butvar" and "Benvar," respectively. These polyvinyl acetal resins are prepared from polyvinyl acetates or Gelvas of different viscosities, and the present invention is concerned with the higher molecular weight resins prepared from the higher viscosity Gelvas, which will be described more specifically below.

The refractory nature of the polyvinyl acetals varies with the type (Formvar, Alvar, etc.) and with the viscosity of the original polyvinyl ester resin and with the extent of the hydrolysis of such resin prior to acetalization. The polyvinyl acetals are usually characterized in the industry by two numbers, the first number indicating the viscosity of the original polyvinyl acetate resin (Gelva), and the second number representing the degree of the hydrolysis of such resin prior to the reaction with the aldehyde. The viscosity value is usually referred to as the "viscosity number" or "Gelva number." Thus a Formvar (polyvinyl formal) 15–95 is one prepared by reacting formaldehyde with the product obtained by hydrolyzing, to the extent of 95%, a polyvinyl acetate resin having a viscosity of 15 centipoises (Gelva 15) when measured at 20° C. in a benzene solution containing 86 grams of the Gelva per liter. As will be readily understood, the lower Gelva numbers refer to the less tough resins, while the higher Gelva numbers indicate harder and tougher resins. The hydrolysis number represents, as is known, the mole per cent of acetyl radicals removed from the polyvinyl acetate resin by the hydrolysis and is determined in known manner.

As the Alvars, Butvars, and other polyvinyl acetal resins made with aldehydes of higher molecular weights than formaldehyde are less refractory than a corresponding Formvar prepared from the same polyvinyl acetate resin, Alvars, Butvars, etc. corresponding in toughness to a given Formvar, will have a higher Gelva (polyvinyl acetate) number or a higher hydrolysis number, and generally both. For this reason no single range of Gelva numbers and/or hydrolysis numbers will apply to all types of polyvinyl acetal resins, since the ranges of these values for the refractory resins of each type will be different; and for this reason I have referred to hard, tough, high softening point and generally difficultly workable resins of these different types, as refractory resins. I may, however, state that in the case of the Formvars, the refractory resins will have a Gelva number of at least 7, and a hydrolysis number of at least 80%. A Gelva number of 7 corresponds roughly to an original polyvinyl acetate resin having a molecular weight of approximately 11,700, while the polyvinyl formal resin of such Gelva number and hydrolysis number of 80 will have a molecular weight of, roughly, 7,000. The refractoriness of the polyvinyl acetal resin will increase with increase of one or both of the Gelva and hydrolysis numbers. In the case of the Alvars, the resins become rather refractory when the Gelva number is at least about 15, while with Butvars, the Gelva number begins at about 25; in both cases the hydrolysis number is at least 80. In the preferred forms of the invention, the hydrolysis number is at least 90%. With other polyvinyl acetal resins, the minimum Gelva number will differ correspondingly, but I regard all these resins as falling within the scope of the present invention where they have a hydrolysis number of at least 80(%), and they are prepared from a Gelva having such a viscosity that the final resin is of refractory character and generally unsuited for ordinary molding operations.

It is known that polyvinyl acetate resins (Gelvas) of the same viscosities but prepared by different procedures, may nevertheless yield polyvinyl acetal resins of different viscosities or degrees of toughness, even though all other factors such as degree of hydrolysis, the nature of the aldehyde, etc. are the same. Thus Gelvas prepared in benzene solution and having the same viscosity as one prepared in toluene solution, or by any other process such as the suspension process, and hydrolyzed to the same degree, will, on treatment in similar fashion with an aldehyde, produce polyvinyl acetal resins of different viscosities. For the sake of simplicity, the Gelvas will be assumed in the present specification and in the subjoined claims to have been prepared in a benzene solution, and the Gelva numbers will refer to the viscosity of Gelvas so prepared, and the hydrolysis numbers are to be understood as referring to the degree of hydrolysis of such Gelvas. It is accordingly to be understood that where I make reference to a Gelva of a certain viscosity, the same will embrace also Gelvas made in other solvents than benzene or by other procedures, and having an equivalent viscosity, that is, yielding acetal resins of substantially the same viscosity as that made from the benzene-prepared Gelva on hydrolysis to the same degree and treatment with the same aldehyde. These Gelva resins prepared by other procedures are accordingly to be regarded as equivalents of the herein specified Gelvas where on similar hydrolysis and treatment with aldehyde they yield polyvinyl acetal resins of substantially the same order of hardness and toughness.

The preferred types of Formvars are those having a Gelva number of about 10 to 30 and a hydrolysis number of about 90 to 100. With the Alvars, the preferred Gelva numbers are from about 25 to 60, while the hydrolysis numbers are about 90 to 100. In the case of the Butvars, the preferred Gelva number range is from about 40 to 100, while the hydrolysis number is above 95. For the manufacture of sound recordings, a Formvar having a Gelva number of 15 and a hydrolysis number of 95, has proved to be highly satisfactory.

The polyvinyl acetal resin may, if desired, be replaced in part by a tough polyvinyl acetate resin, say, up to about half its weight. In such case it is desirable, especially when the acetal resin is a polyvinyl butyral resin, to add a form stabilizing resin, like yacca gum.

The sharp melting, more or less brittle resin should, of course, be compatible with the polyvinyl acetal resin. If it is found that a particular composition has excessive form stability there can be added to the binder either a plasticizer, like orthonitro-diphenyl, or a low softening point fluxing resin, like "Staybelite," or both, or the amount of the acetal resin can be reduced. It will be evident that acetal resins with relatively low molecular weight will have less toughening effect than higher molecular weight resins and will have to be present in larger quantities; and as already indicated, toughening resins with very high form stability can be used along with a plasticizer. Thus, when Butvar resin of the same molecular weight as a Formvar 15/95 is used in place of the Formvar, the amount of plasticizer will have to be decreased because of the lower form stability of the Butvar resins.

As described in my above-mentioned application, the molding composition preferably contains also a parting agent which can consist of a metal stearate and a hard wax. About 2-5 per cent of metal stearate based on the total weight of binder can be employed. As the hard wax there may be used carnauba or ceranova in an amount varying from about 0.1-0.5% based on the weight of binder.

The filler can be any material commonly employed in the manufacture of the cheaper phonograph records, such as fine red clay filler such as that sold under the name "Red Filler 1019" (99% through 325 mesh). For obvious reasons it is preferred to employ the filler in the finely comminuted form. Among other materials that may be used are "Lesomite," "Atomite," both of which are forms of calcium carbonate, "Superfloss," "Celite," "Diccalite" which are diatomaceous earths, and "Keystone" which is a whiting material (calcium carbonate). Among other plasticizers that may be used are beta-chloronaphthalene, such as that sold under the trade name "Halowax 1013," methylphthalate ethyl glycollate, like that sold under the brand name "M 17" (Monsanto), dibutyl sebacate, and dimethoxyethylphthalate, such as that sold under the name "Methox."

An additional advantage resulting from the preponderance of the sharp-melting resins in my binder compositions flows from the fact that larger proportions of filler can be used with such binder than with that described in my aforementioned application. Thus the ratio of filler to binder may be as high as about 1.5 to 1.9 of filler to 1 part of binder, in contrast to the 0.5 to 1.0 part of filler to each part of binder employed in the molding compositions of my copending application. Hence the cost of my improved molding compositions is reduced not only by reason of the formulation of the binder primarily as a brittle, sharp-melting resin of low cost, but also because less binder is used for a given weight of filler.

Satisfactory formulations in accordance with the invention are presented by way of illustration in the following, all parts being by weight:

|  | Example 1 | Example 2 | Example 3 | Example 4 | Example 5 |
|---|---|---|---|---|---|
| Formvar 15/95 | 100 | 100 | 100 | 100 | 100 |
| Vinsol | 343 | 445 | 260 | 340 | 341 |
| Carbonex | 343 | 222 | 260 | 345 | 345.5 |
| Staybelite | | | 85 | 23 | 22.7 |
| Lead Stearate | 22 | 24 | 25 | 23 | 22.7 |
| Carbon Black | 22 | 24 | 25 | 32 | 34.1 |
| Orthonitrodiphenyl | 19 | 24 | 13 | 20 | 19.5 |
| Ceranova Wax | 3 | 3 | 6 | 3 | 2.7 |
| Red Filler 1019 (clay) | 780 | 980 | 1,240 | 840 | 1,375 |
| Keystone | 620 | 615 | | 550 | |

|  | Example 6 | Example 7 | Example 8 | Example 9 | Example 10 | Example 11 |
|---|---|---|---|---|---|---|
| Butvar 25/98 | 100 | | | | | |
| Butvar 55/98 | | 100 | 100 | 100 | 100 | 50 |
| Vinsol | 285 | 310 | | | 236 | |
| Demi Gum | | | 310 | 472 | 236 | 260 |
| Carbonex | 285 | 310 | 310 | 355 | 355 | 310 |
| Staybelite | 19 | 20 | 40 | 24 | 24 | 40 |
| Lead Stearate | 19 | 20 | 20 | 24 | 24 | 20 |
| Ceranova Wax | 2 | 2½ | 2½ | 3 | 3 | 2½ |
| Carbon Black | 30 | 34 | 34 | 40 | 40 | 34 |
| Orthonitrodiphenyl | | 8 | 8 | 8 | 8 | 8 |
| Filler Red Clay | 1,160 | 1,250 | 1,250 | 1,460 | 1,460 | 1,250 |
| Gelva V60 | | | | | | 50 |
| Yacca | | | | | | 50 |

The above mixtures may be compounded in any suitable manner as by fine grinding the different components and intimately mixing them on differential speed rolls at a temperature of about 200-260° F. for about 10 minutes, or in a jacketed Banbury mixer or similar apparatus. They are then sheeted on even speed rolls, and cut into "biscuits" where the composition is to be employed for the manufacture of phonograph records; in such case also, the filler should be of extremely fine particle size in order to reduce needle scratch.

The acetal resins in the above formulation can be replaced by other acetal resins or by mixtures thereof, provided that they are of sufficiently high molecular weight. Where a tougher resin of higher molecular weight is employed than that represented by Formvar 15-95, smaller quantities thereof can be employed for producing a molding composition of approximately the same molding properties.

The speed of fusion and solidification can be increased by using larger proportions of the sharp-melting resins. The orthonitrodiphenyl acts as a plasticizer, and smaller quantities thereof can be used when a less tough acetal resin is employed or larger quantities of the sharp melting resin. The tougher resin just referred to (that is, tougher than Formvar 15-95) may be Formvar having a Gelva number as high as 60 or even higher, the primary limitation on the toughness and melocular weight of the acetal resins employable in the above formulas being imposed by their availability on the market. This applies also to the other acetal resins, and to the polyvinyl acetates used in admixture with the acetal resins, all of them, regardless of their molecular weight, being suitable for use in my composition provided that they have the necessary toughness.

I claim:

1. A heat and pressure-moldable composition suitable for the manufacture of heat and pressure-molded phonograph records, and comprising a mixture of approximately 3 to 10 parts of at least one brittle, sharp-melting resin selected from the group consisting of petroleum hydrocarbon-insoluble, aromatic hydrocarbon-soluble resinous pine wood extracts, coal tar pitch, gashouse pitch, and hardwood pitch, toughened with one part of a tough, horny, higher melting and difficultly moldable polyvinyl acetal resin, said mixture containing also an inorganic filler in larger proportion than the combined amount of the resins and a relatively small proportion of a wax.

2. A composition as defined in claim 1, wherein the polyvinyl acetal resin is polyvinyl formal.

3. A composition as defined in claim 1, wherein the polyvinyl acetal resin is polyvinyl butyral.

4. A composition as defined in claim 1, wherein the sharp-melting resin consists of a mixture of resinous pine wood extract and a sharp-melting pitch.

5. A composition as defined in claim 1, wherein the sharp-melting resin consists of resinous pine wood extract and a mixture of coal tar and gashouse pitches.

6. A composition as defined in claim 1, wherein the sharp-melting resin consists of a mixture of hardwood, coal tar, and gashouse pitches.

7. A composition as defined in claim 1, wherein the acetal resin is a polyvinyl formal obtained from a polyvinyl acetate having a viscosity of approximately 15 centipoises (measured at 20° C. in a benzene solution containing 86 grams of the polyvinyl acetate per liter) and hydrolyzed to the extent of about 95%.

8. A composition as defined in claim 1, wherein the polyvinyl acetal consists of a polyvinyl butyral obtained from a polyvinyl acetate having a viscosity of approximately 25 to 55 centipoises (measured at 20° C. in a benzene solution containing 86 grams of the polyvinyl acetate per liter) and hydrolyzed to the extent of about 98%.

9. A composition as defined in claim 1, wherein the sharp-melting resin includes for each part of the polyvinyl acetal, about 6 parts of approximately equal amounts of the said pine wood extract and of a mixture of coal tar and gashouse pitches.

10. A composition as defined in claim 1, wherein the sharp-melting resins have a melting point range of about 195-250° F.

11. A heat and pressure-molded phonograph record having the sound groove molded therein and prepared from the composition defined in claim 1.

GEORGE F. METZ.

REFERENCES CITED

The following references are of record in the file of this patent:

UNITED STATES PATENTS

| Number | Name | Date |
|---|---|---|
| 1,956,837 | Schmidt | May 1, 1934 |
| 1,997,489 | Herrmann et al. | Apr. 9, 1935 |
| 2,114,393 | Lane | Apr. 19, 1938 |
| 2,130,239 | Hunter | Sept. 13, 1938 |
| 2,193,026 | Hall | Mar. 12, 1940 |

FOREIGN PATENTS

| Number | Country | Date |
|---|---|---|
| 410,770 | Great Britain | Aug. 11, 1933 |

OTHER REFERENCES

"Asphalts and Allied Substances," page 371, Abraham, New York, January 1938.